(12) United States Patent
Lim

(10) Patent No.: US 7,511,743 B2
(45) Date of Patent: Mar. 31, 2009

(54) VIDEO ENCODING APPARATUS HAVING AUDIO SELECTION FUNCTION AND METHOD THEREOF

(75) Inventor: Seok-Hun Lim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 790 days.

(21) Appl. No.: 10/937,632

(22) Filed: Sep. 9, 2004

(65) Prior Publication Data
US 2005/0147376 A1 Jul. 7, 2005

(30) Foreign Application Priority Data
Jan. 7, 2004 (KR) .................. 10-2004-0000957

(51) Int. Cl.
*H04N 5/76* (2006.01)
(52) U.S. Cl. .................................. 348/231.4
(58) Field of Classification Search ............... 348/231.4
See application file for complete search history.

(56) References Cited

U.S. PATENT DOCUMENTS

2001/0005684 A1* 6/2001 Inkinen et al. ............. 455/556
2004/0203608 A1* 10/2004 Osann ...................... 455/412.1
2006/0135056 A1* 6/2006 Rydgren ......................... 455/1
2006/0229114 A2* 10/2006 Kim .......................... 455/575.1

* cited by examiner

*Primary Examiner*—James M Hannett
(74) *Attorney, Agent, or Firm*—The Farrell Law Firm, PC

(57) ABSTRACT

Disclosed is a video encoding apparatus having an audio selection function and a method thereof which enables input of diverse audio signals and improves the quality of video/audio data in a camcorder phone by selectively applying a plurality of audio input units to a video encoder in a camcorder phone. The video encoding apparatus having a plurality of audio input units, includes a video acquisition unit for acquiring and transferring input video information, an audio selection unit for receiving audio information from the audio input units, and selecting at least one audio path for transferring selected audio information from among the received audio information, and a video encoder for generating a multimedia file in which the video information and the audio information are combined by synchronizing and combining the video information acquired by and transferred from the video acquisition unit with the specified audio information transferred through the audio selection unit.

6 Claims, 4 Drawing Sheets

VIDEO ENCODING APPARATUS HAVING AUDIO SELECTION FUNCTION AND METHOD THEREOF

PRIORITY

This application claims priority to an application entitled "Video Encoding Apparatus Having Audio Selection Function And Method Thereof" filed in the Korean Industrial Property Office on Jan. 7, 2004 and assigned Serial No. 2004-957, the contents of which are incorporated herein by reference.

BACKGROUND OF THE INVENTION

1. Field of the Invention

The present invention relates generally to a camcorder phone in which a mobile communication terminal incorporates a camcorder function, and more particularly to a video encoding apparatus having an audio selection function and a method thereof which generates multimedia data through a camcorder function in a camcorder phone.

2. Description of the Related Art

In a conventional camcorder phone, a simple camcorder function is incorporated in a mobile communication terminal, and thus its performance as far as functionality and quality deteriorates in comparison to a typical camcorder.

The mobile communication terminal receives an audio signal input through a built-in microphone provided in the terminal. However, since the microphone of the mobile communication terminal is mainly designed to receive an audio signal over a short distance (i.e., within about 30 cm from the microphone), it deteriorates the performance of a camcorder mounted in the mobile communication terminal to use the microphone of the mobile communication terminal as an input device for the camcorder function.

Meanwhile, although the above-described problem can be solved by using a separate microphone, it lowers the portability and convenience of the camcorder phone to carry such a separate microphone.

SUMMARY OF THE INVENTION

Accordingly, the present invention has been made to solve the above-mentioned and other problems occurring in the prior art, and an object of the present invention is to provide a video encoding apparatus having an audio selection function and a method thereof which enables the input of diverse audio signals and improves the quality of video/audio data in a camcorder phone by selectively applying a plurality of audio input units to a video encoder in a camcorder phone.

In order to accomplish this object, there is provided a video encoding apparatus having a plurality of audio input units, which comprises a video acquisition unit for acquiring and transferring input video information, an audio selection unit for receiving audio information from the audio input units, and selecting at least one audio path for transferring selected audio information from among the received audio information, and a video encoder for generating a multimedia file in which the video information and the audio information are combined by synchronizing and combining the video information acquired by and transferred from the video acquisition unit with the specified audio information transferred through the audio selection unit.

In accordance with another aspect of the present invention, there is provided a video encoding method having an audio selection function in a camcorder phone provided with a video encoding apparatus, which comprises the steps of activating a camcorder unit of the camcorder phone, selecting at least one audio path among a plurality of input audio paths corresponding to a plurality of audio sources as an audio source of multimedia data, and generating the multimedia data by combining an audio from the audio source input through the selected audio path with a video acquired through the camcorder unit.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
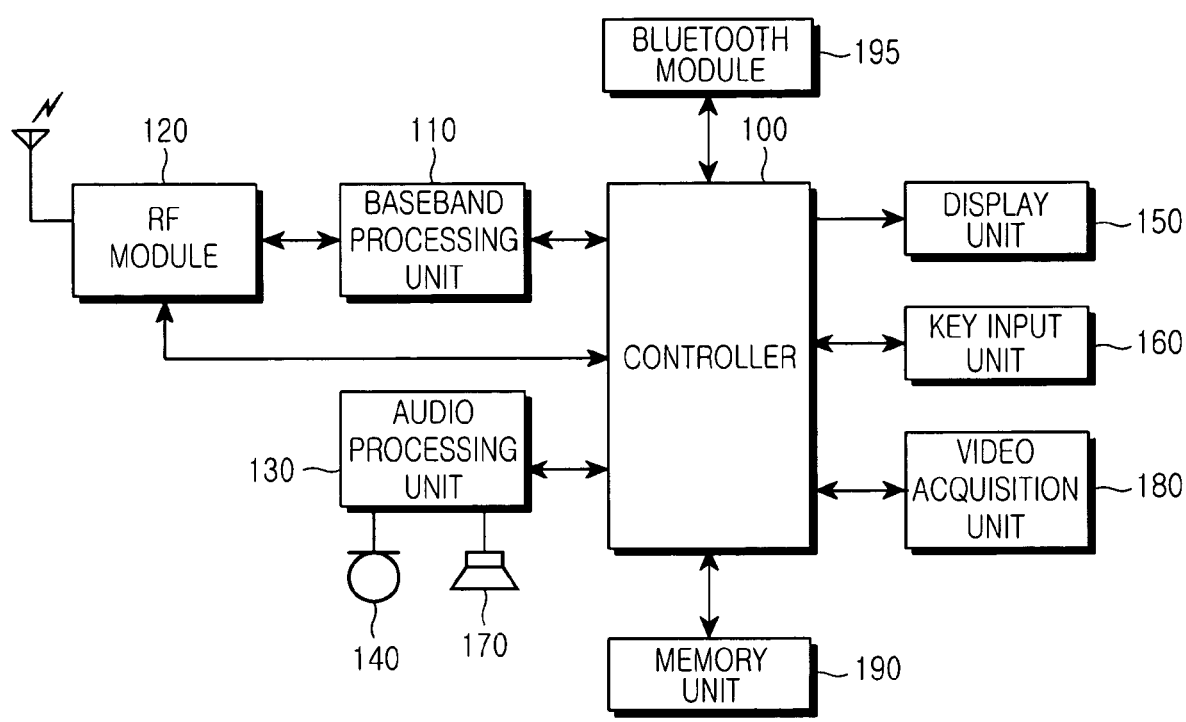
FIG. 1 is a block diagram illustrating the construction of a typical camcorder phone to which the present invention is applied.

Hereinafter, the video encoding apparatus having an audio selection function and a method thereof according to preferred embodiments of the present invention will be described with reference to the accompanying drawings. In the following description of the present invention, the same drawing reference numerals are used for the same elements even in different drawings. Also, a detailed description of known functions and configurations incorporated herein will be omitted when it may obscure the subject matter of the present invention.

FIG. 1 is a block diagram illustrating the construction of a typical camcorder phone to which the present invention is applied.

Referring to FIG. 1, the camcorder phone includes a controller 100 which processes and controls the functions including a video encoding operation having an audio selection function according to the present invention in addition to a phone call, a wireless Internet connection, etc. A memory unit 190 is provided with a ROM (Read Only Memory) for storing micro codes of a program for the process and control of the controller 100 and reference data, a RAM (Random Access Memory) for serving as a working memory for the controller 100, and a flash RAM for providing a storage area for storing data that can be updated and includes multimedia data. An audio processing unit 130, which is connected to the controller 100, processes a phone call, an audio recording, a terminating alarm sound output, etc., through a microphone 140 and a speaker 170, and in the present invention, it provides an audio path during a camcorder operation. A display unit 150 displays received data or information. A key input unit 160 includes numeric keys for inputting the numerals of 0 to 9, and function keys for setting functions including menu, incoming/outgoing call, delete, end, *, #, volume, etc., and provides to the controller 100 key input data corresponding to the key pressed by a user. An RF module 120 and a baseband processing unit 110 transmit/receive radio signals to/from base stations of a mobile communication network through an antenna, and in the present invention, they provide an audio path during a camcorder operation. A Bluetooth module 195 is a communication module that enables a radio communication through Bluetooth radio frequency technology, and in the present invention, it provides an audio path during a camcorder operation. A video acquisition unit 180 acquires video data in the present invention.

Figure 2:
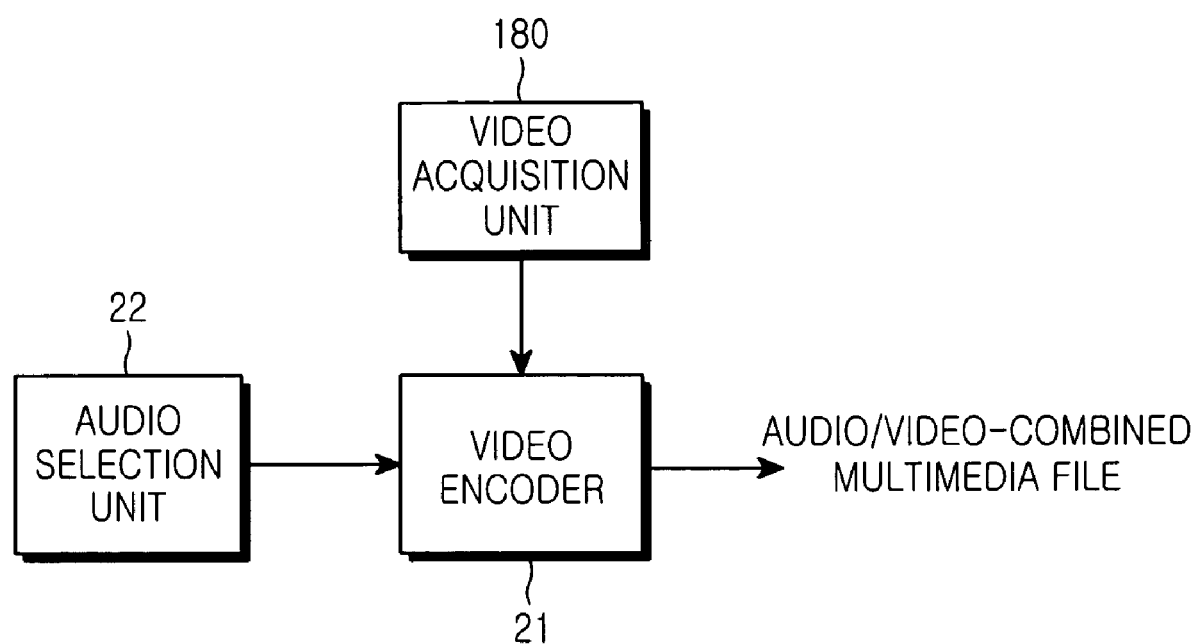
FIG. 2 is a block diagram illustrating the construction of a video encoding apparatus having an audio selection function according to the present invention.

FIG. 2 is a block diagram illustrating the construction of a video encoding apparatus having an audio selection function according to the present invention.

As shown in FIG. 2, the video encoding apparatus having an audio selection function includes a video acquisition unit 180 for acquiring and transferring video information input through a video camera lens, an audio selection unit 22 for selecting an audio path from among a plurality of audio input units including a microphone 140 or an RF module 120 in accordance with a selection by the user or a specified set value, and transferring audio information according to the selected audio path, and a video encoder 21 for generating a multimedia file in which the video information and the audio information are combined by synchronizing and combining the video information acquired by and transferred from the video acquisition unit 180 with the audio information transferred through the audio selection unit 22.

Specifically, unlike the conventional camcorder phone having a microphone and a video camera, the present invention is provided with the video acquisition unit 180, which is a video camera, and the audio selection unit 22, which selects an audio signal of a desired audio path from among a plurality of audio paths, and selects and synchronizes the video signal with the selected audio signal to generate multimedia data.

In the embodiment of the present invention, the audio selection unit 22 and the video encoder 21 are function blocks in the controller 100. However, such function blocks may be implemented as external devices provided outside the controller 100.

Figure 3:
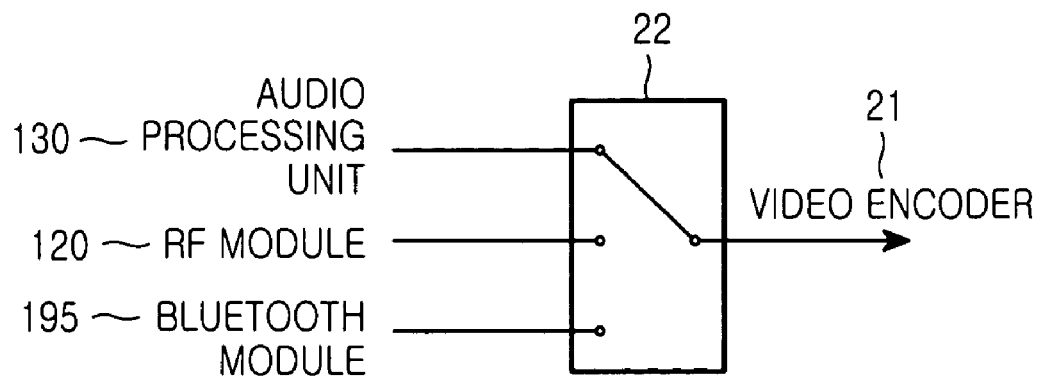
FIG. 3 is a circuit diagram of an audio selection unit in the video encoding apparatus according to the present invention.

FIG. 3 is a circuit diagram of the audio selection unit in the video encoding apparatus according to the present invention.

Referring to FIG. 3, the audio selection unit 22 according to the present invention is provided within the controller of FIG. 1. The audio selection unit 22 receives a communication signal through the RF module 120, the Bluetooth module 195, etc., as shown in FIG. 1, a signal from the microphone 140 transferred through the audio processing unit 130, and a control signal transferred through the key input unit 160 in accordance with the selection of the user, and performs a switching operation that connects one of the input audio signals to the video encoder 21.

In FIG. 3, although outputs of the audio processing unit 130, the RF module 120, and the Bluetooth module 195 are described as inputs of the audio selection unit 22, the present invention is not limited thereto, but may use diverse communication methods including methods for a wireless local area network (LAN), infrared (IR) communication, etc.

In the embodiment of the present invention, only one signal path is connected by the switching operation, but it is also possible to simultaneously input two or more signals to the video encoder 21. That is, an audio signal from an audio source such as MP3 and the output of the microphone may be processed as one audio input, so that the two audio signals are simultaneously output through the speaker.

Since the multimedia data through the video encoder is generated by combining the input audio and the input video, changes to the input audio before the corresponding data is processed does not affect the generated multimedia data. Accordingly, it is possible to change the audio path selected by the audio selection unit 22 during the process of generating the multimedia data.

Figure 4A:
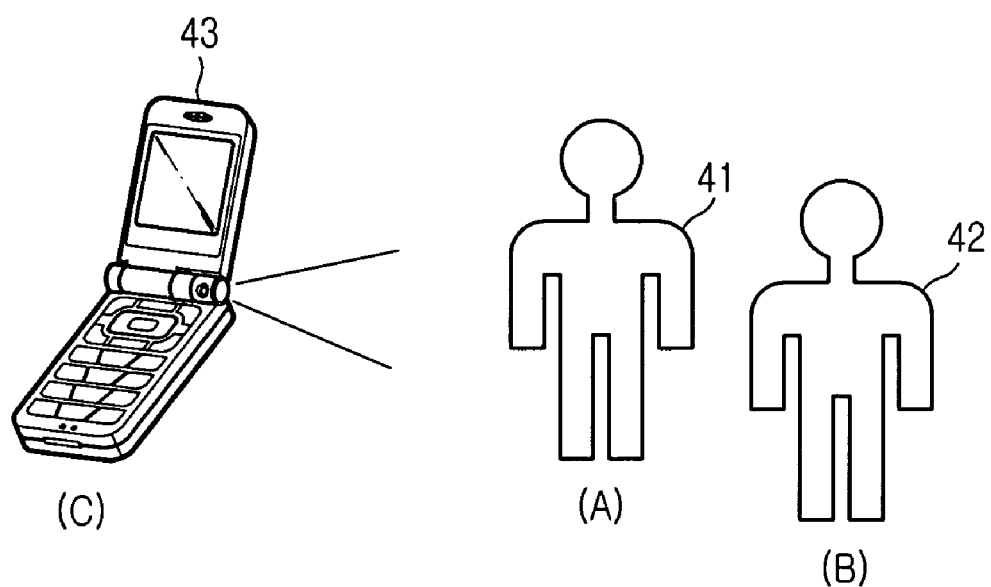
FIGS. 4a and 4b are diagrams illustrating operational environments of the present invention.
Figure 4B:
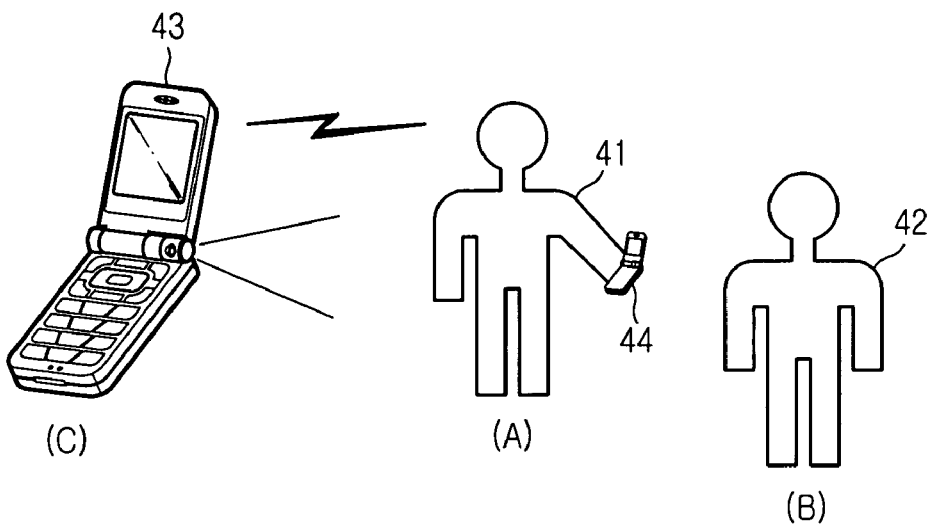

FIGS. 4a and 4b are diagrams illustrating operational environments of the present invention.

FIG. 4a illustrates an environment of multimedia data generation using a conventional camcorder phone. As shown in FIG. 4a, a camcorder phone (C) 43 operates in a state that it is quite distant from the objects (A and B) 41 and 42 the subject of the filming.

In this case, since the camcorder phone operates in the state that it is quite distant from the objects, it is difficult for the camcorder to record the contents of a dialog between the objects (A and B) 41 and 42. Particularly, in a noisy outdoor environment, the situation becomes more severe.

FIG. 4b illustrates an environment of multimedia data generation using a camcorder phone provided with a video encoder having an audio selection function according to the present invention. As shown in FIG. 4b, a camcorder phone (C) 43 operates in a state that it is quite distant from the objects (A and B) 41 and 42 the subject of the filming, in the same environment as illustrated in FIG. 4a.

In this case, the camcorder phone 43, while it is filming objects (A and B) 41 and 42, makes a call connection with a mobile communication terminal 44 owned by object (A) 41, and then generates multimedia data by combining audio information input through the RF module with video information in a call connection state, so that the contents of the dialog between the objects (A and B) 41 and 42 can be recorded even if the camcorder phone 43 filming the objects are quite a distant from the camcorder phone.

As described above, in the case of the conventional camcorder phone, a zoom microphone or a wire/wireless microphone should be separately used in order to effect a long-distance audio recording. By contrast, according to the present invention, it is possible to overcome the problem involved in the conventional camcorder through the call connection using the communication equipment. In the embodiment of the present invention, it is described that the audio path is selected in the call connection state through the mobile communication. However, it is also possible to select the audio input through the Bluetooth, wireless LAN, or other communication means and to use the selected audio as the audio of the multimedia data.

Figure 5:
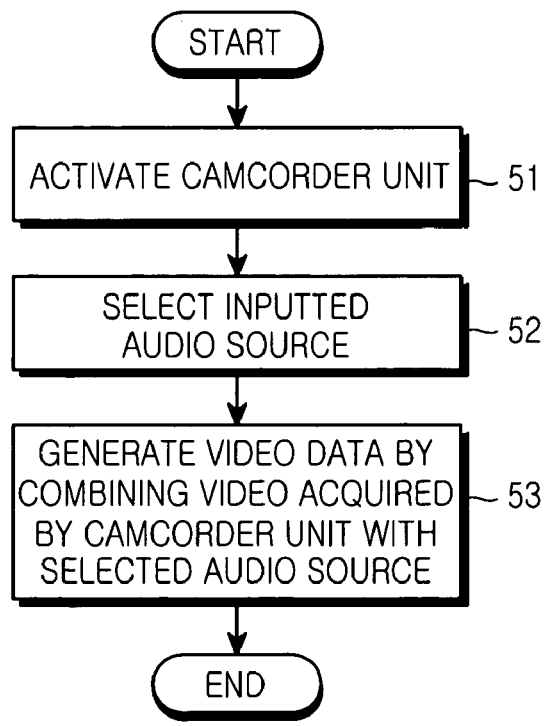
FIG. 5 is a flowchart illustrating a video encoding method having an audio selection function in a camcorder phone according to the present invention.

FIG. 5 is a flowchart illustrating a video encoding method having an audio selection function in a camcorder phone according to the present invention.

As shown in FIG. 5, the camcorder phone provided with the video encoding apparatus having the audio selection function according to the present invention activates a camcorder unit of the camcorder phone in order to perform the camcorder function (step 51).

Then, the camcorder phone determines an audio path among a plurality of input audio paths corresponding to a plurality of audio sources (step 52). In this case, the audio path is selected according to a predetermined selection of the audio path or according to a selection by the user.

Then, the camcorder phone generates the multimedia data by combining the audio signal from the audio source input through the selected audio path with the video signal acquired through the camcorder unit (step 53).

The method according to the present invention as described above may be implemented by a program, and stored in a recording medium (e.g., CD ROM, floppy disc, hard disc, optomagnetic disc, etc.) in the form readable through a computer.

As described above, the present invention has the effect that it can switch an audio input to a camcorder phone in accordance with the position of an object to be filmed by selectively applying a plurality of audio input units to a video encoder in the camcorder phone, and thus it enables combining of an audio that is proper to the video filmed by the camcorder phone.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A video encoding apparatus having a plurality of audio input units, comprising:
    a video acquisition unit for acquiring and transferring a video source;
    an audio selection unit for receiving a plurality of audio sources from the audio input units, and selecting a predetermined number of audio sources so as to transfer the selected audio sources from among the received plurality of audio sources; and
    a video encoder for generating a multimedia file by synchronizing and combining the video source with the selected predetermined number of audio sources,
    wherein audio information, transmitted from a sending telecommunication device to a receiving telecommunication device via a call connection, is provided, by the receiving telecommunication device, as an audio source selectable as one of the selected predetermined number of audio sources synchronized and combined with the video source.

2. The video encoding apparatus as claimed in claim 1, wherein the video encoding apparatus is provided in a camcorder phone in which a camcorder and a mobile communication terminal are combined, and audio information through a microphone of the camcorder phone and audio information from a wireless communication of the camcorder phone are input through the plurality of audio input units.

3. The video encoding apparatus as claimed in claim 2, wherein the audio selection unit can change the selected audio sources during generation of the multimedia file in order to change the currently transferred audio sources to other audio sources.

4. The video encoding apparatus as claimed in claim 1, wherein the audio selection unit can change the selected audio sources during generation of the multimedia file in order to change the currently transferred audio sources to other audio sources.

5. A video encoding method having an audio selection function in a camcorder phone provided with a video encoding apparatus, the method comprising:
    activating a camcorder unit of the camcorder phone;
    selecting a predetermined number of audio sources to be used as audio sources of multimedia data among a plurality of input audio sources; and
    generating the multimedia data by synchronizing and combining the predetermined number of audio sources with a video source acquired through the camcorder unit, wherein the predetermined number of audio sources are selected by a user,
    wherein audio information, transmitted from a sending telecommunication device to a receiving telecommunication device via a call connection, is provided, by the receiving telecommunication device, as an audio source selectable as one of the selected predetermined number of audio sources synchronized and combined with the video source.

6. The video encoding method as claimed in claim 5, wherein the selection of the audio sources is predetermined.

* * * * *